US011030684B2

(12) United States Patent
Edwards et al.

(10) Patent No.: US 11,030,684 B2
(45) Date of Patent: Jun. 8, 2021

(54) METHOD FOR MANAGING AN ELECTRONIC ACCOUNT ASSOCIATED WITH A PIGGY BANK

(71) Applicant: Capital One Services, LLC, McLean, VA (US)

(72) Inventors: Joshua Edwards, Philadelphia, PA (US); Michael Mossoba, Arlington, VA (US); Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 152 days.

(21) Appl. No.: 16/548,380

(22) Filed: Aug. 22, 2019

(65) Prior Publication Data

US 2021/0056617 A1 Feb. 25, 2021

(51) Int. Cl.
*G06Q 40/02* (2012.01)
*G06Q 20/40* (2012.01)

(52) U.S. Cl.
CPC .......... *G06Q 40/02* (2013.01); *G06Q 20/405* (2013.01); *G06Q 20/4037* (2013.01)

(58) Field of Classification Search
CPC ... G06Q 40/02; G06Q 20/4037; G06Q 20/405
USPC ........................................................ 705/42
See application file for complete search history.

(56) References Cited

U.S. PATENT DOCUMENTS

| 8,459,544 | B2 * | 6/2013 | Casey ................ G06Q 20/2295 |
| | | | 235/379 |
| 8,577,803 | B2 * | 11/2013 | Chatterjee ............ G06Q 20/386 |
| | | | 705/41 |
| 9,058,626 | B1 * | 6/2015 | Donaho ................... G07D 9/00 |
| 9,799,014 | B2 * | 10/2017 | Yahn ......................... G07F 9/08 |
| 10,169,946 | B1 | 1/2019 | Benkreira et al. |
| 2005/0173515 | A1 * | 8/2005 | Sawa ...................... G07F 9/026 |
| | | | 235/379 |

(Continued)

OTHER PUBLICATIONS

Mike Snider, Digital recorders close the sound gap, Jun. 1, 1992, USA Today—a division of Gannett Satellite Information Network, Inc., Newspaper, 2 pages (e.g., see Gadgets, Etc.) (Year: 1992).*

(Continued)

*Primary Examiner* — Benjamin S Brindley
(74) *Attorney, Agent, or Firm* — Harrity & Harrity, LLP

(57) ABSTRACT

A device assigns an identifier to a piggy bank associated with a child, and associates the identifier with a first transaction account associated with the child and a second transaction account associated with a parent of the child. The device receives information indicating a value of money deposited into the piggy bank, and updates the first transaction account, based on the information indicating the value of money, to generate an updated balance for the first transaction account. The device provides, to the piggy bank or a user device associated with the piggy bank, information indicating the updated balance for the first transaction account, and receives information indicating a measurement associated with the piggy bank. The device verifies the updated balance for the first transaction account based on the measurement associated with the piggy bank, and causes the updated balance for the first transaction account to be provided to the parent.

20 Claims, 12 Drawing Sheets

(56) References Cited

U.S. PATENT DOCUMENTS

| | | | | |
|---|---|---|---|---|
| 2009/0271287 A1* | 10/2009 | Halpern | ................. | G06Q 30/02 |
| | | | | 705/26.1 |
| 2012/0290417 A1* | 11/2012 | Luevane | ................. | G07G 1/12 |
| | | | | 705/16 |
| 2013/0091058 A1* | 4/2013 | Huster | ................. | G06Q 20/322 |
| | | | | 705/44 |
| 2013/0232064 A1* | 9/2013 | Bosch | ..................... | G07F 19/20 |
| | | | | 705/43 |
| 2014/0136351 A1* | 5/2014 | Lennon | ................. | G07F 17/42 |
| | | | | 705/18 |
| 2019/0082804 A1* | 3/2019 | O'Kane | ................. | H04W 4/80 |

OTHER PUBLICATIONS

The Digi-Piggy, "About", http://digipiggy.com/about/, Dec. 27, 2015, 3 pages.

Coinstar Asset Holdings, LLC, "How It Works", https://www.coinstar.com/howcoinstarworks, Dec. 3, 2015, 4 pages.

* cited by examiner

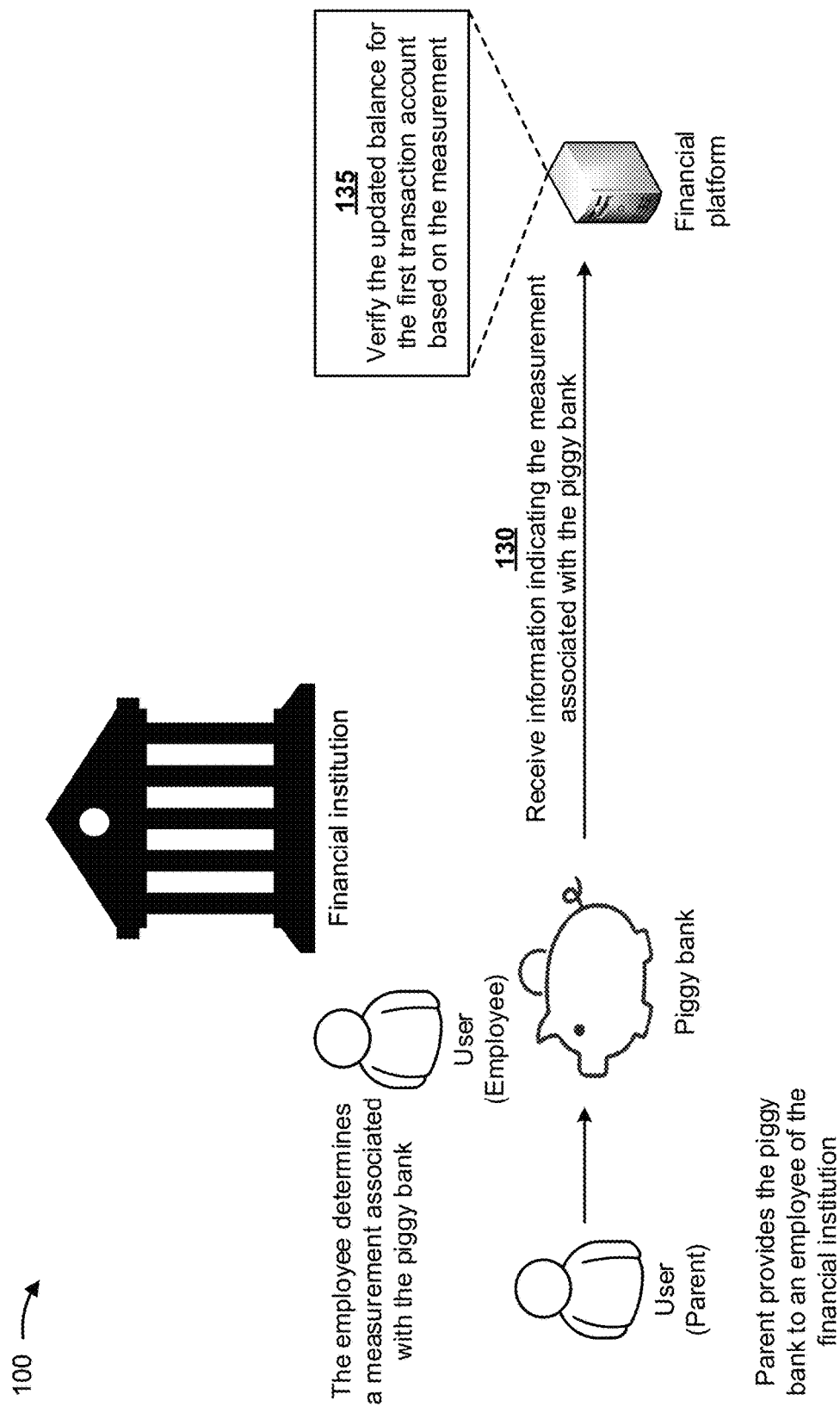

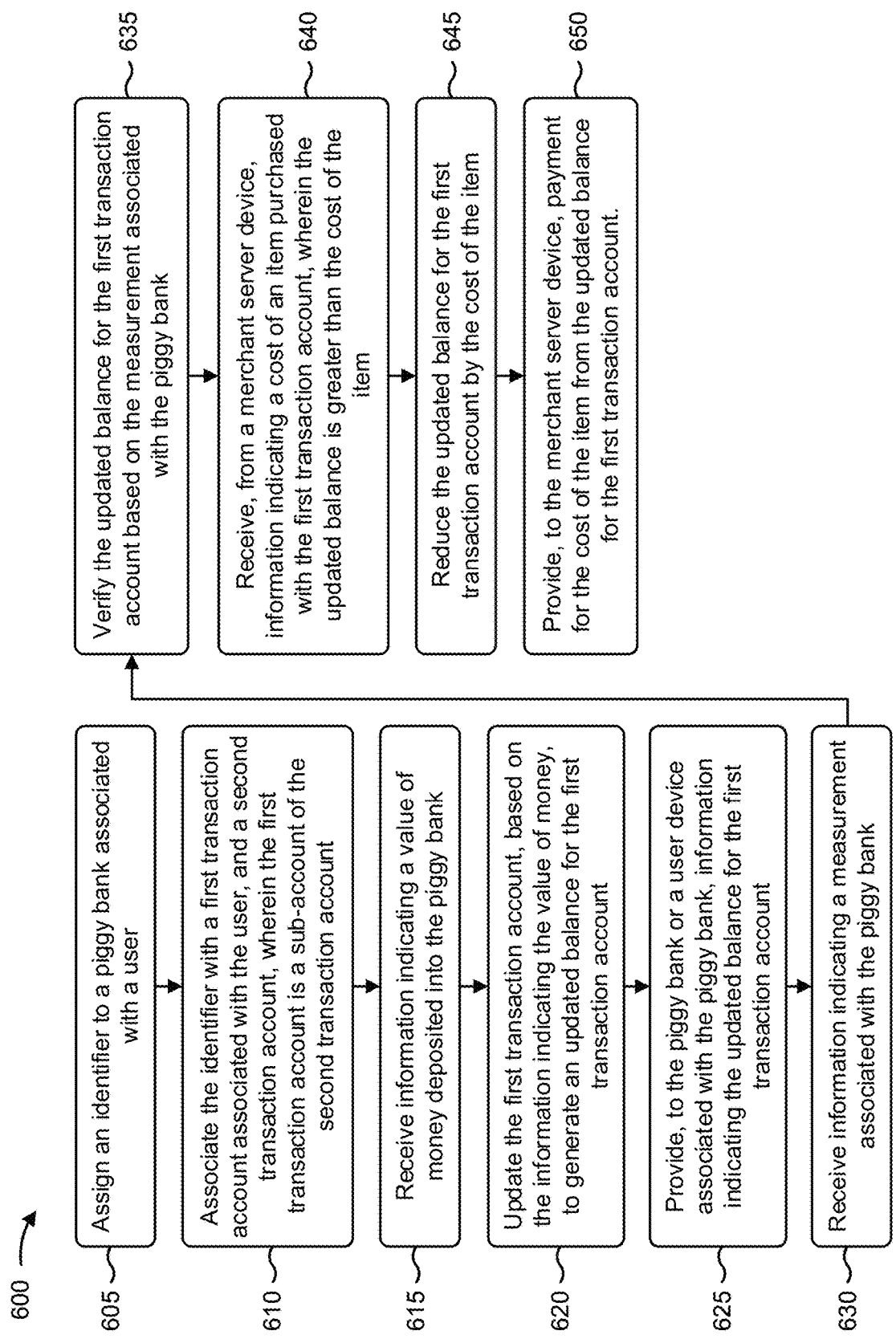

US 11,030,684 B2

METHOD FOR MANAGING AN ELECTRONIC ACCOUNT ASSOCIATED WITH A PIGGY BANK

BACKGROUND

A piggy bank, sometimes referred to as a penny bank or a money box, is a name given to a coin container that is normally used by children. The piggy bank is known to collectors as a still bank and is often used by companies for promotional purposes.

SUMMARY

According to some implementations, a method may include assigning an identifier to a piggy bank associated with a first user, and associating the identifier with a first transaction account associated with the first user and a second transaction account associated with a second user, wherein the first transaction account is a sub-account of the second transaction account. The method may include receiving information indicating a value of money deposited into the piggy bank, and updating the first transaction account, based on the information indicating the value of money, to generate an updated balance for the first transaction account. The method may include providing, to the piggy bank or a user device associated with the piggy bank, information indicating the updated balance for the first transaction account, and receiving information indicating a measurement associated with the piggy bank. The method may include verifying the updated balance for the first transaction account based on the measurement associated with the piggy bank, and causing, based on verifying the updated balance, the updated balance for the first transaction account to be associated with a third transaction account.

According to some implementations, a device may include one or more memories; and one or more processors, communicatively coupled to the one or more memories, configured to assign an identifier to a piggy bank associated with a first user, and associate the identifier with a first transaction account associated with the first user, and a second transaction account associated with a second user, wherein the first transaction account is a sub-account of the second transaction account. The one or more processors may receive information indicating a value of money deposited into the piggy bank, and may update the first transaction account, based on the information indicating the value of money, to generate an updated balance for the first transaction account. The one or more processors may provide, to the piggy bank or a user device associated with the piggy bank, information indicating the updated balance for the first transaction account, and may receive information indicating a measurement associated with the piggy bank. The one or more processors may verify the updated balance for the first transaction account based on the measurement associated with the piggy bank, and may provide, when the updated balance is verified, the updated balance for the first transaction account to a transaction card.

According to some implementations, a non-transitory computer-readable medium may store one or more instructions that, when executed by one or more processors of a device, may cause the one or more processors to assign an identifier to a piggy bank associated with a user, and associate the identifier with a first transaction account associated with the user, and a second transaction account, wherein the first transaction account is a sub-account of the second transaction account. The one or more instructions may cause the one or more processors to receive information indicating a value of money deposited into the piggy bank, and update the first transaction account, based on the information indicating the value of money, to generate an updated balance for the first transaction account. The one or more instructions may cause the one or more processors to provide, to the piggy bank or a user device associated with the piggy bank, information indicating the updated balance for the first transaction account, and receive information indicating a measurement associated with the piggy bank. The one or more instructions may cause the one or more processors to verify the updated balance for the first transaction account based on the measurement associated with the piggy bank, and receive, from a merchant server device, information indicating a cost of an item purchased with the first transaction account, wherein the updated balance is greater than the cost of the item. The one or more instructions may cause the one or more processors to reduce the updated balance for the first transaction account by the cost of the item, and provide, to the merchant server device, payment for the cost of the item from the updated balance for the first transaction account.

BRIEF DESCRIPTION OF THE DRAWINGS

FIGS. 1A-1G are diagrams of one or more example implementations described herein.

FIGS. 4-6 are flow charts of example processes for associating a piggy bank with a first transaction account that is guaranteed by a second transaction account and managing the first transaction account.

DETAILED DESCRIPTION

The following detailed description of example implementations refers to the accompanying drawings. The same reference numbers in different drawings may identify the same or similar elements.

Children may save money in a piggy bank, but may not have a way to determine an amount of money in the piggy bank without breaking the piggy bank. Children also do not have an easy way to spend the money in the piggy bank without taking the money out of the piggy bank, rolling change included in the money, and taking rolled change to a bank. Children do not typically use financial accounts to pay for an item. Furthermore, an individual that receives gifts of cash cannot spend the cash instantaneously without having to first deposit the cash at an institution (e.g., which requires an account at the institution).

Some implementations described herein provide a financial platform that associates a piggy bank with a first transaction account that is guaranteed by a second transaction account and manages the first transaction account. For example, the financial platform may assign an identifier to a piggy bank associated with a child, and may associate the identifier with a first transaction account associated with the child and a second transaction account associated with a parent of the child, where the first transaction account may be a sub-account of the second transaction account. The financial platform may receive information indicating a value of money deposited into the piggy bank, and may update the first transaction account, based on the information indicating the value of money, to generate an updated balance for the first transaction account. The financial platform may provide, to the piggy bank or a user device associated with the piggy bank, information indicating the updated balance for the first transaction account, and may receive information indicating a measurement associated with the piggy bank. The financial platform may verify the updated balance for the first transaction account based on the measurement associated with the piggy bank, and may cause, based on verifying the updated balance, the updated balance for the first transaction account to be provided to the parent.

In this way, the financial platform provides a quick and easy way to manage an account associated with a piggy bank, which conserves resources (e.g., processing resources, memory resources, network resources, transportation resources, and/or the like) that would otherwise be wasted in transporting rolled change to a bank, counting the rolled change at the bank, performing a transaction to receive cash for the rolled change, and/or the like. Furthermore, an individual that receives gifts of cash may spend the cash instantaneously without having to first deposit the cash at an institution and without having an account at the institution.

Figure 1A:
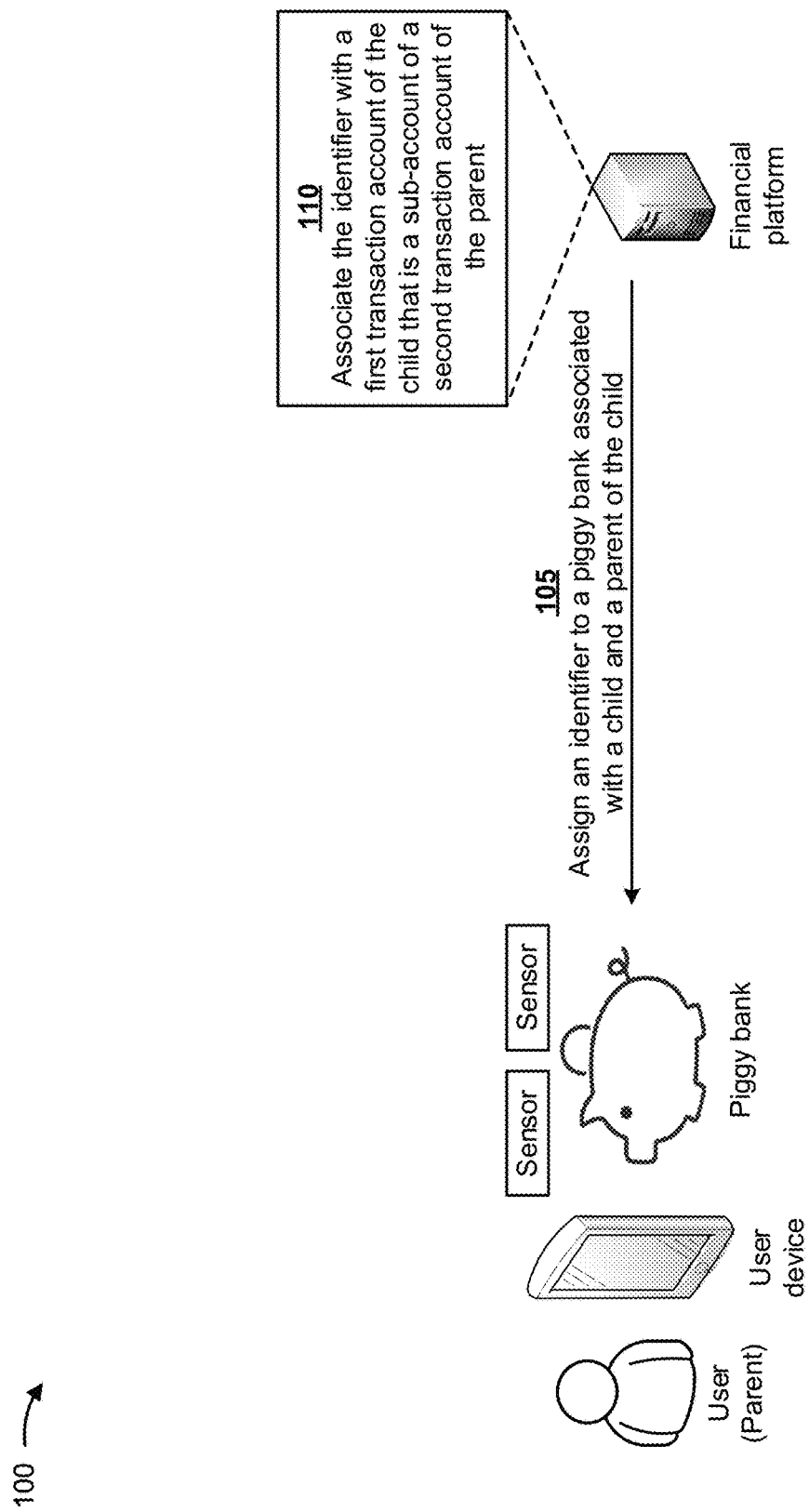

FIGS. 1A-1G are diagrams of one or more example implementations 100 described herein. As shown in FIG. 1A, a piggy bank may be associated with a user device and a financial platform. The user device may be associated with a parent of a child that utilizes the piggy bank to save money. In some implementations, the piggy bank may include a money box, a penny bank, or any container to retain money, and may be utilized by any user (e.g., a child, an adult, and/or the like) to receive and hold money. As further shown, the piggy bank may include one or more sensors to identify money (e.g., coins, cash, and/or the like) provided to the piggy bank and to identify a value of money provided to the piggy bank. In some implementations, the sensors may include a scale to determine a weight of the money provided to the piggy bank, a photosensor to identify the money provided to the piggy bank, a camera to identify the money provided to the piggy bank, a mechanical counting device, and/or the like. The sensors may communicate directly with the user device and/or the financial platform via a network (e.g., a wireless network). In some implementations, the piggy bank may be powered by a battery or an electrical outlet and may turn on when money is being received by the piggy bank (e.g., to prevent receipt of money while the piggy bank is powered down).

In some implementations, the piggy bank may be provided with a security mechanism to detect tampering with the piggy bank. For example, to prevent fraud associated with the piggy bank, a user of the piggy bank may have a guaranteed transaction account at a financial institution, the piggy bank may be provided with a sensor that detects tampering with the piggy bank (e.g., a sensor that detects movement of the piggy bank when a smartphone of the user is not detected adjacent to the piggy bank), the piggy bank may be provided with a digital lock or a mechanical lock, and/or the like.

In some implementations, the piggy bank may include computing resources (e.g., processing resources, memory resources, a display component, and/or the like) that enable the piggy bank to receive inputs from the sensors, calculate the value of money deposited into the piggy bank based on the inputs from the sensors, display the value of money currently provided in the piggy bank, display a value of money identified by the sensors while the money is being deposited into the piggy bank, and/or the like. In some implementations, the user device may execute an application that communicates with the sensors of the piggy bank, and performs one or more of the functions described above in connection with the piggy bank.

As further shown in FIG. 1A, and by reference number 105, the financial platform may assign an identifier to the piggy bank associated with the child and/or the parent of the child. The identifier may include one or more numbers, one or more characters, a combination of one or more characters and numbers, and/or like that provides an identification for the piggy bank. In some implementations, the financial platform may provide the identifier to the user device, may assign the identifier to the user device, and/or the like.

As further shown in FIG. 1A, and by reference number 110, the financial platform may associate the identifier with a first transaction account of the child. In some implementations, the first transaction account may a sub-account of a second transaction account of the parent (e.g., the second transaction account may be a guarantor account of the first transaction account). In some implementations, the transaction accounts may include checking accounts, savings accounts, transaction card accounts, and/or the like.

Figure 1B:
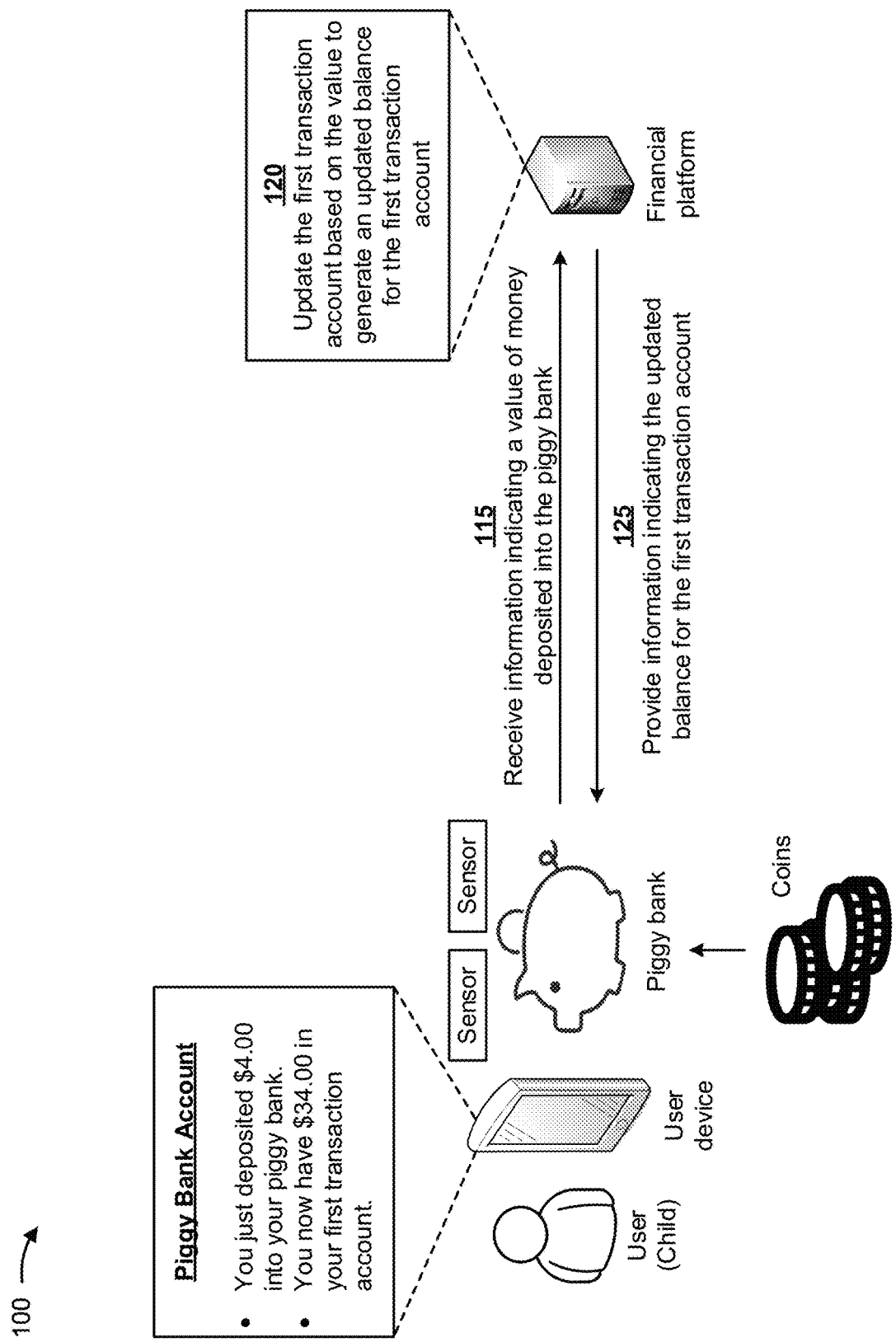

As shown in FIG. 1B, the child may provide money (e.g., coins, bills, and/or the like) to the piggy bank. The sensors may identify the money and may determine a value of the money while the money is provided to the piggy bank. As further shown in FIG. 1B, and by reference number 115, the financial platform may receive, from the user device and/or from the piggy bank, information indicating the value of money deposited into the piggy bank. In some implementations, the financial platform may receive the information indicating the value of money deposited into the piggy bank each time a new coin or a new bill is deposited into the piggy bank. In some implementations, the financial platform may periodically receive the information indicating the value of money deposited into the piggy bank after a predetermined time period (e.g., after one hour, a few hours, one day, and/or the like). Such implementations may conserve computing resources (e.g., processing resources, memory resources, and/or the like), network resources, and/or the like associated with communicating the information each time a new coin or a new bill is deposited into the piggy bank. For example, if the child is depositing one hundred pennies, such implementations may prevent communication of the information one hundred times.

As further shown in FIG. 1B, and by reference number 120, the financial platform may update the first transaction account based on the value to generate an updated balance for the first transaction account. For example, if the first transaction account included a balance of $30.00 prior to the deposit of the money and the child deposited $4.00 into the piggy bank, the financial platform may update the balance of the first transaction account to $34.00. In some implementations, the balance in the first transaction account may provide an indication of a quantity of money stored in the piggy bank.

As further shown in FIG. 1B, and by reference number 125, the financial platform may provide, to the piggy bank and/or the user device, information indicating the updated balance for the first transaction account. In some implementations, the piggy bank and/or the user device may receive the information indicating the updated balance for the first transaction account and may provide the information for display via a user interface. For example, as shown, the user interface may include information indicating that the child just deposited $4.00 into the piggy bank, information indicating that there is now $34.00 in the first transaction account, and/or the like.

Although FIGS. 1A and 1B show specific quantities of user devices, piggy banks and/or the like, in some implementations, the financial platform may be associated with more user devices, piggy banks, and/or the like than depicted in FIGS. 1A and 1B. For example, the financial platform may be associated with hundreds, thousands, millions, and/or the like of user devices, piggy banks, and/or the like that generate thousands, millions, billions, etc. of data points. In this way, the financial platform may handle thousands, millions, billions, etc., of data points within a time period, and thus may provide "big data" capability.

Although implementations are described in connection with a parent and a child, in some implementations the piggy bank may be associated with a single user, a first user (e.g., a minor or a disabled person, as defined by applicable law, who may be unable to independently secure an account with a financial institution) and a second user (e.g., a parent or a guardian, as defined by applicable law, with an account that guarantees the account of the first user), and/or the like.

As shown in FIG. 1C, after money is provided to the piggy bank, the parent may bring the piggy bank to a financial institution associated with the financial platform. The parent may provide the piggy bank to an employee of the financial institution, and the employee may determine a measurement associated with the piggy bank. In some implementations, the measurement may include a weight of the piggy bank (e.g., as determined by a scale), a quantity of money provided in the piggy bank (e.g., the employee may empty the piggy bank and may count the money in the piggy bank, may utilize a machine to count the money, and/or the like), and/or the like.

In some implementations, the measurement associated with the piggy bank may be determined at a location other than the financial institution associated with the financial platform, the first transaction account, and the second transaction account. For example, the parent may bring the piggy bank (e.g., for the measurement) to other locations, such as a financial kiosk (e.g., an automated teller machine), a financial institution not associated with the first transaction account and the second transaction account, a courier delivery service location, a postal service location, an ecommerce service location, and/or the like. The other locations may provide, to the parent, a receipt indicating the measurement (e.g., the value of money provided in the piggy bank and deposited in the first transaction account). In some implementations, the employee of the financial institution may empty the piggy bank and return the piggy bank to the parent, may keep the piggy bank and provide a new piggy bank to the parent, and/or the like. In another example, the piggy bank may include a security mechanism that is electrically controlled by a signal from the financial kiosk that allows an employee of the financial institution to open the piggy bank and manually enter contents of the piggy bank into a counting machine.

As further shown in FIG. 1C, and by reference number 130, the financial platform may receive information indicating the measurement associated with the piggy bank. In some implementations, the information indicating the measurement may be received from a user device associated with the employee, from a money counting machine utilized by the employee, and/or the like. In some implementations, the parent may provide the contents of the piggy bank to a money counting machine that counts the money in the piggy bank and provides a determined amount to the financial platform. Such implementations may be self-service and may not require interaction with the employee.

As further shown in FIG. 1C, and by reference number 135, the financial platform may verify the updated balance for the first transaction account based on the measurement. For example, if the measurement is a weight of the piggy bank, the financial platform may verify that the weight corresponds to a weight calculated by the financial platform for the piggy bank. In some implementations, the financial platform may utilize the information indicating the value of money deposited into the piggy bank and weights associated with such money to calculate the weight. The financial platform may compare the calculated weight with the measurement weight, and may verify the updated balance in the first transaction account when the calculated weight matches the measurement weight. When the calculated weight does not match the measurement weight, the financial platform may adjust the updated balance in the first transaction account based on a difference between the calculated weight and the measurement weight.

Figure 1D:
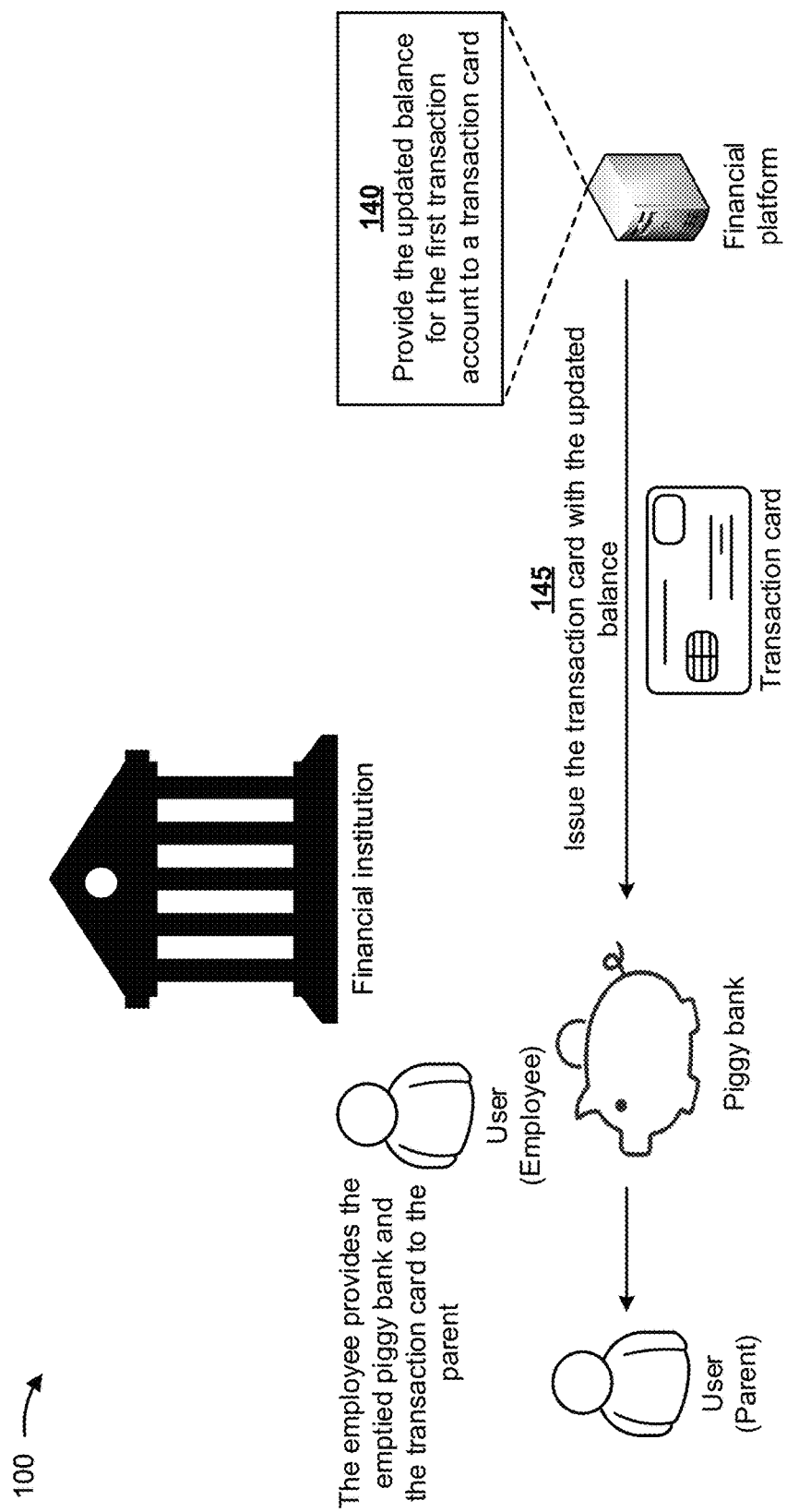

As shown in FIG. 1D, and by reference number 140, if the financial platform verifies the updated balance for the first transaction account, the financial platform may provide the updated balance for the first transaction account to a transaction card. In some implementations, the transaction card may include a credit card, a debit card, a gift card, a rewards card, and/or the like. In some implementations, the transaction card may be associated with the first financial account, and the parent and/or the child may utilize the transaction card to withdraw money, make purchases, and/or the like.

As further shown in FIG. 1D, and by reference number 145, the financial platform may issue the transaction card with the updated balance. For example, the employee may utilize a user device to interact with the financial platform and associate a blank transaction card with the first transaction account. Once associated, the employee may provide the transaction card with the updated balance and the emptied piggy bank to the parent.

Figure 1E:
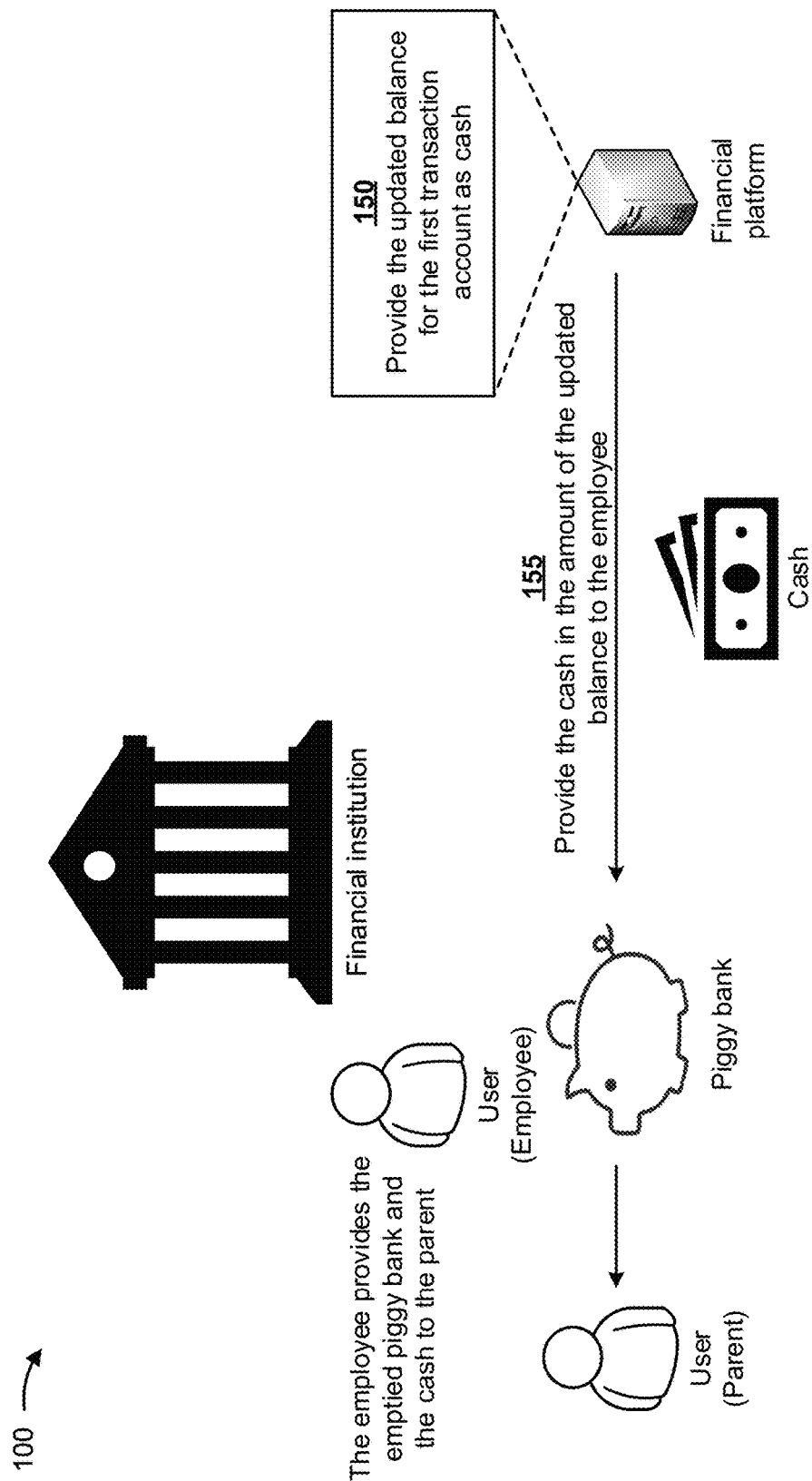

As shown in FIG. 1E, and by reference number 150, if the financial platform verifies the updated balance for the first transaction account, the financial platform may provide the updated balance for the first transaction account as cash to the employee. In some implementations, the financial platform may provide less than the updated balance for the first transaction account as cash. In such implementations, the financial platform may provide a portion of the updated balance as cash and may leave the remaining portion of the updated balance in the first transaction account or may provide the remaining portion of the updated balance to the transaction card.

As further shown in FIG. 1E, and by reference number 155, the financial platform may provide the cash in the amount of the updated balance to the employee. For example, the employee may utilize a user device to interact with the financial platform and receive the cash from the first transaction account. Once received, the employee may provide the cash in the amount of the updated balance and the emptied piggy bank to the parent.

In some implementations, the services provided by the employee may be automatically provided by a self-service kiosk provided by the financial institution. For example, the piggy bank may include a security mechanism that enables the parent to utilize the self-service kiosk. The self-service kiosk may weigh the piggy bank, empty the piggy bank, return the emptied piggy bank, return a new piggy bank and keep the piggy bank, issue the transaction card, issue the cash, and/or the like.

Figure 1F:
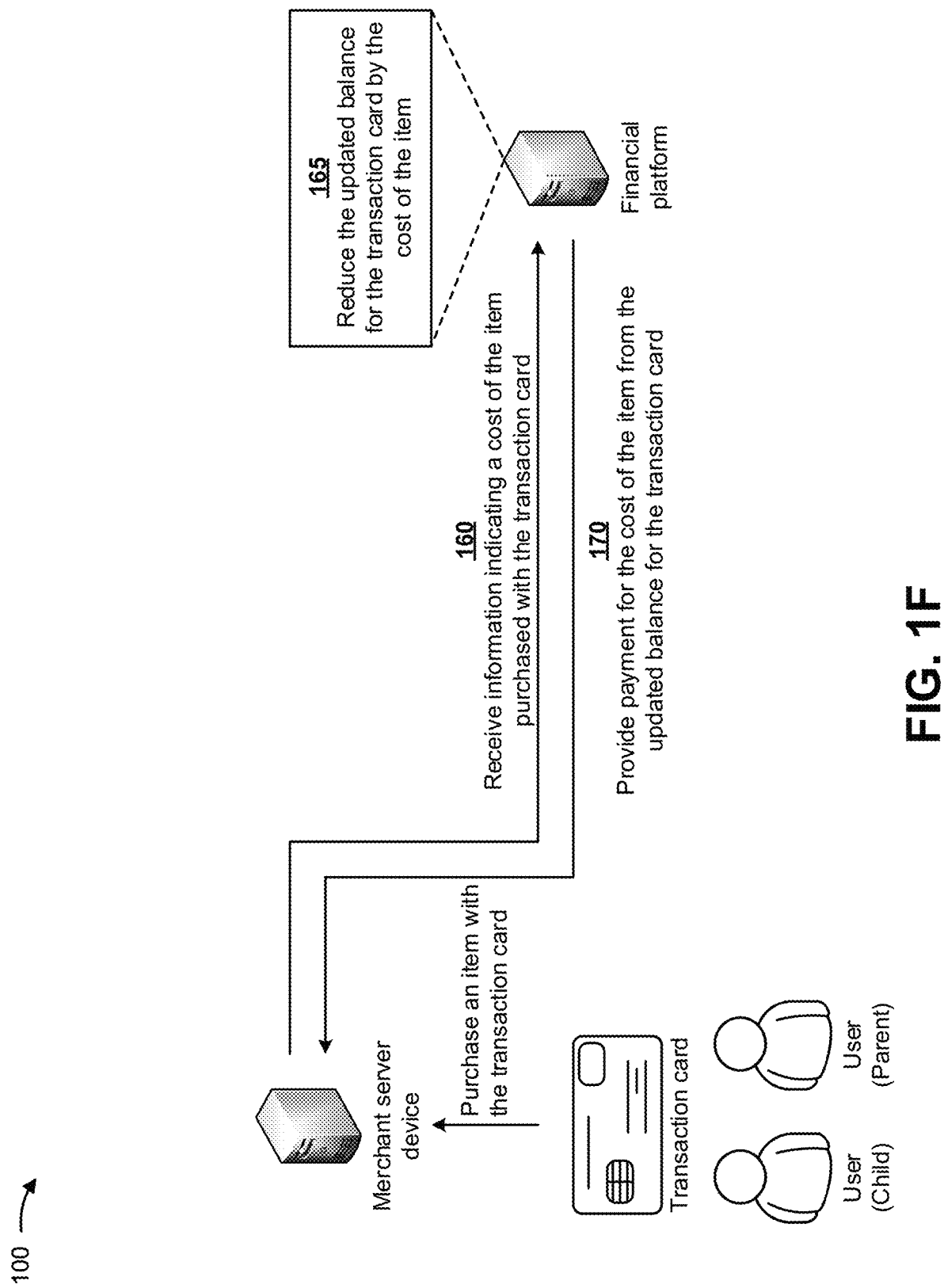

As shown in FIG. 1F, the parent and the child may utilize the transaction card to conduct a transaction with (e.g., purchase an item from) a merchant associated with a merchant server device. For example, the child may wish to purchase a toy with a cost that is less than the updated balance for the transaction card. The merchant server device may conduct the transaction with the transaction card and may provide, to the financial platform, information indicating a cost of the item purchased with the transaction card.

As further shown in FIG. 1F, and by reference number 160, the financial platform may receive, from the merchant server device, the information indicating the cost of the item purchased with the transaction card. For example, the financial platform may receive information indicating the cost of the toy to be purchased by the child. As further shown in FIG. 1F, and by reference number 165, the financial platform may reduce the updated balance for the transaction card by the cost of item. For example, the financial platform may reduce the updated balance for the transaction card by the cost of the toy.

As further shown in FIG. 1F, and by reference number 170, the financial platform may provide, to the merchant server device, payment for the cost of the item from the updated balance for the transaction card. In this way, the child may utilize the money saved in the piggy bank to make purchases and to see how such purchases affect the child's savings.

Figure 1G:
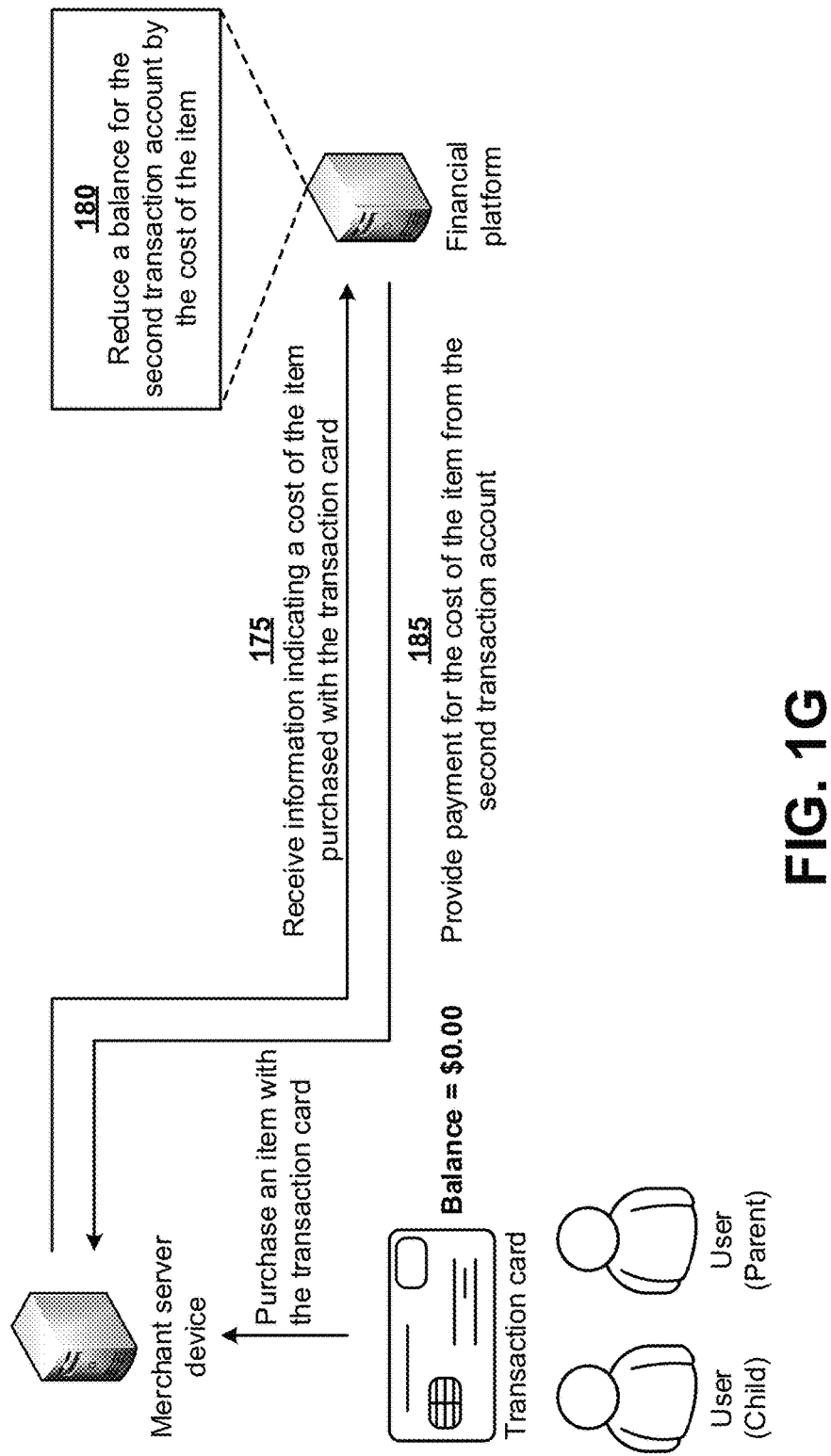

As shown in FIG. 1G, the parent and the child may utilize the transaction card to conduct another transaction with (e.g., purchase an item from) the merchant associated with the merchant server device. In this example, the updated balance for the transaction card may be zero or less than the cost of the item. The merchant server device may conduct the transaction with the transaction card and may provide, to the financial platform, information indicating the cost of the item purchased with the transaction card.

As further shown in FIG. 1G, and by reference number 175, the financial platform may receive, from the merchant server device, the information indicating the cost of the item purchased with the transaction card. For example, the financial platform may receive information indicating the cost of the toy to be purchased by the child. As further shown in FIG. 1G, and by reference number 180, since the updated balance for the transaction card is less than the cost of the item, the financial platform may reduce a balance for the second transaction account by the cost of the item. In this way, the child may still purchase the item and the second transaction account may cover the cost of the item. However, the child may need to provide more money to the piggy bank in order to repay the parent for the cost of the item. In some implementations, the financial platform may set a time limit for providing the money for the cost of the item to the piggy bank in order to teach the child about money management.

As further shown in FIG. 1G, and by reference number 185, the financial platform may provide, to the merchant server device, payment for the cost of the item from the balance for the second transaction account. In this way, the second transaction account may guarantee a purchase made with the first transaction account. In some implementations, if the updated balance is not zero but is less than the cost of the item, the financial platform may reduce the updated balance for the first transaction account by a portion of the cost of the item, and may reduce a balance for the second transaction account by a remaining portion of the cost of the item. The financial platform may provide, to the merchant server device, payment for the portion of the cost of the item from the updated balance for the first transaction account, and may provide, to the merchant server device, payment for the remaining portion of the cost of the item from the balance for the second transaction account.

In some implementations, the second transaction account may be usable by the child for limited purposes, such as the purposes described above in connection with FIG. 1G. In some implementations, the transaction card may be associated with a shadow account (e.g., the second transaction account of FIG. 1G) that is usable and keeps track of the transactions performed with the transaction card up to a limit (e.g., the purchase of the item from the merchant, as described above in connection with FIG. 1G), where the shadow account may be different than the updated balance presumed to have been deposited into the piggy bank. When money is deposited into the piggy bank, the deposited amount and the shadow account may be reconciled to determine a remaining balance. In some implementations, the piggy may be provided with a security mechanism as described above, may be subjected to spending limits, may be subjected to requirements for depositing contents, and/or the like. The shadow account may enable the owner of the piggy bank to utilize the contents of the piggy to conduct transactions without having to constantly take the piggy bank to the financial institution.

In some implementations, the financial platform may enable real-time digital spending based on physical deposits to the piggy bank, and may provide a mechanism for people unable to attain credit accounts or other financial vehicles to more effectively perform electronic transactions based on local cash deposits to a personal piggy bank. For example, the shadow account enables the owner of the piggy bank to make real-time purchases of items without having to take the piggy bank to the financial institution and add money to a prepaid transaction card. In some implementations, the first transaction account and the second transaction account may be associated with a single user. In some implementations, the piggy bank may include any secure home receptacle that allows for instantaneous spending of money deposited into the receptacle, which may be verified later.

In some implementations, the financial platform may receive, from the merchant server device, information indicating a cost of an item to be purchased with the first transaction account, and the updated balance may be less than the cost of the item. The financial platform may provide, to the merchant server device and based on the updated balance being less than the cost of the item, information indicating denial of a transaction associated with the item, and may provide to the user device associated with the piggy bank the information indicating the denial of the transaction associated with the item, and information indicating a quantity of money to be provided to the piggy bank in order to purchase the item.

In this way, several different stages of the process for associating a piggy bank with a first transaction account that is guaranteed by a second transaction account and managing the first transaction account may be automated, which may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that associates a piggy bank with a first transaction account that is guaranteed by a second transaction account and manages the first transaction account. Further, the process for associating a piggy bank with a first transaction account that is guaranteed by a second transaction account and managing the first transaction account conserves resources (e.g., processing resources, memory resources, network resources, transportation resources, and/or the like) that would otherwise be wasted in transporting rolled change to a bank, counting the rolled change at the bank, performing a transaction to receive cash for the rolled change, and/or the like.

As indicated above, FIGS. 1A-1G are provided merely as examples. Other examples may differ from what is described with regard to FIGS. 1A-1G.

Figure 2:
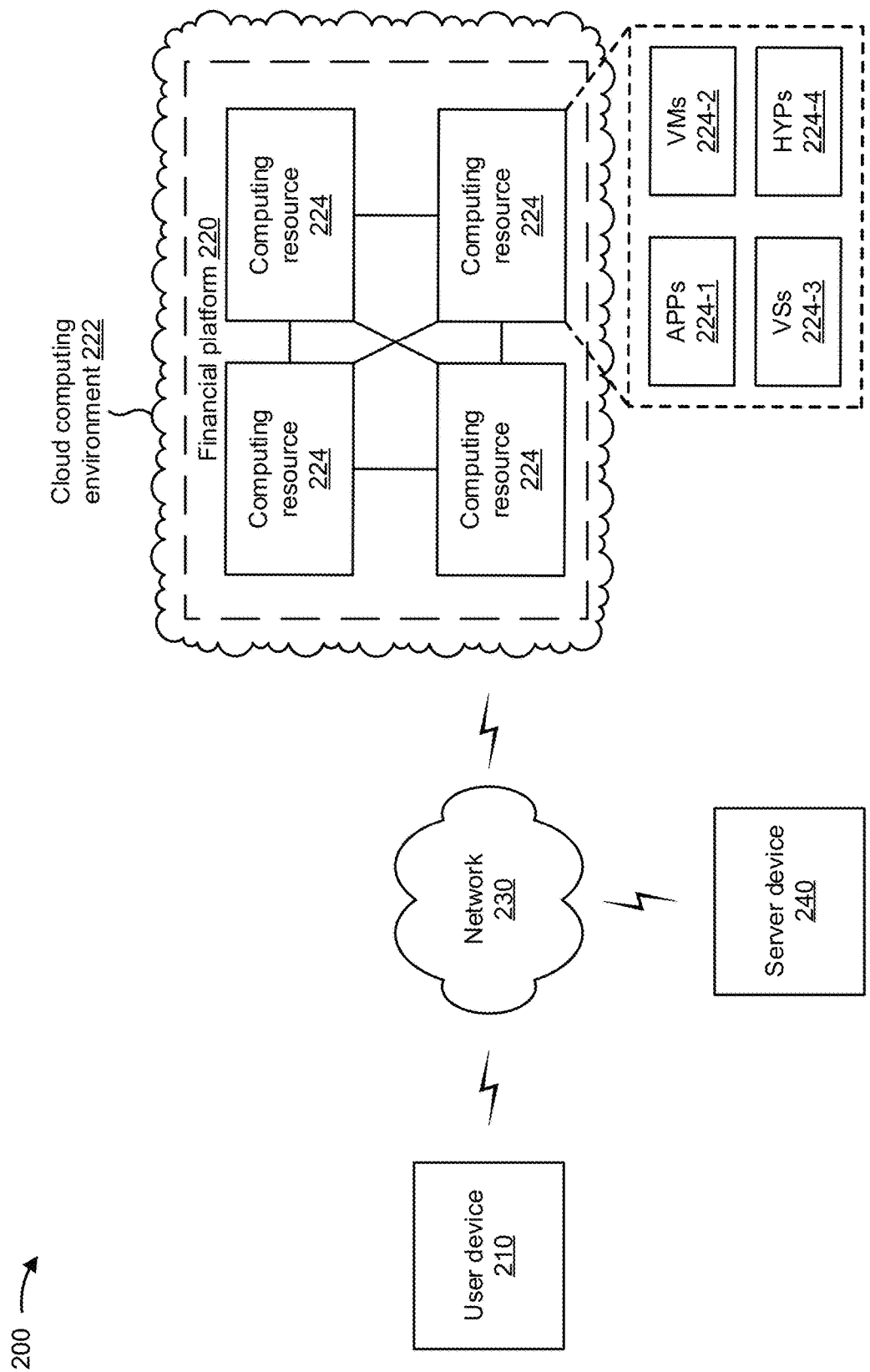
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a financial platform 220, a network 230, and a server device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a piggy bank with sensors, or a similar type of device. In some implementations, user device 210 may receive information from and/or transmit information to financial platform 220 and/or server device 240.

Financial platform 220 includes one or more devices that may associate a piggy bank with a first transaction account that is guaranteed by a second transaction account and may manage the first transaction account. In some implementations, financial platform 220 may be modular such that certain software components may be swapped in or out depending on a particular need. As such, financial platform 220 may be easily and/or quickly reconfigured for different uses. In some implementations, financial platform 220 may receive information from and/or transmit information to one or more user devices 210 and/or server devices 240.

In some implementations, as shown, financial platform 220 may be hosted in a cloud computing environment 222. Notably, while implementations described herein describe financial platform 220 as being hosted in cloud computing environment 222, in some implementations, financial platform 220 may be non-cloud-based (i.e., may be implemented outside of a cloud computing environment) or may be partially cloud-based.

Cloud computing environment 222 includes an environment that may host financial platform 220. Cloud computing environment 222 may provide computation, software, data access, storage, etc. services that do not require end-user knowledge of a physical location and configuration of system(s) and/or device(s) that host financial platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host financial platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with financial platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of financial platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with a financial institution, a merchant, and/or the like. In some implementations, server device 240 may receive information from and/or transmit information to user device 210 and/or financial platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
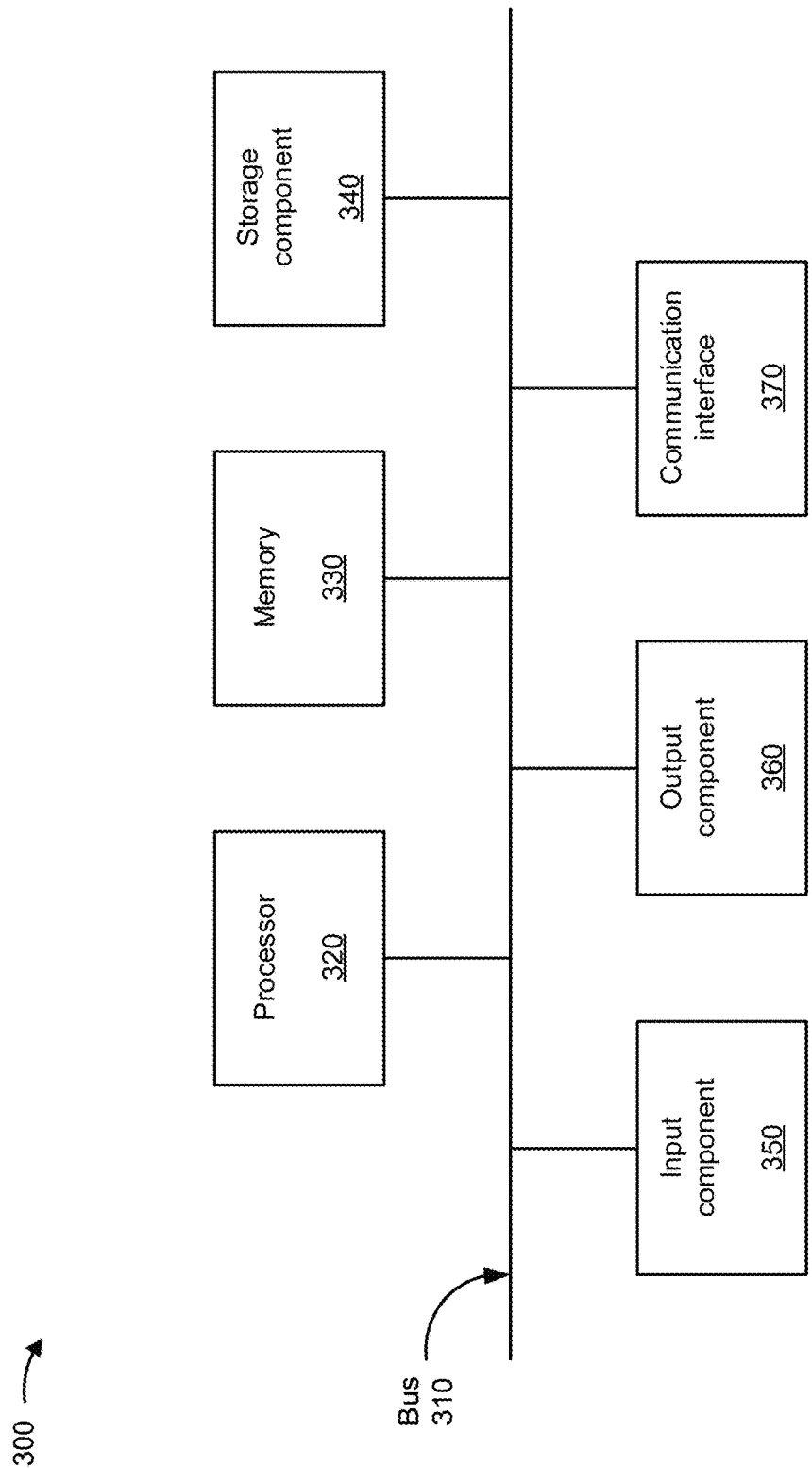
FIG. 3 is a diagram of example components of one or more devices of FIG. 2.

FIG. 3 is a diagram of example components of a device 300. Device 300 may correspond to user device 210, financial platform 220, computing resource 224, and/or server device 240. In some implementations, user device 210, financial platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
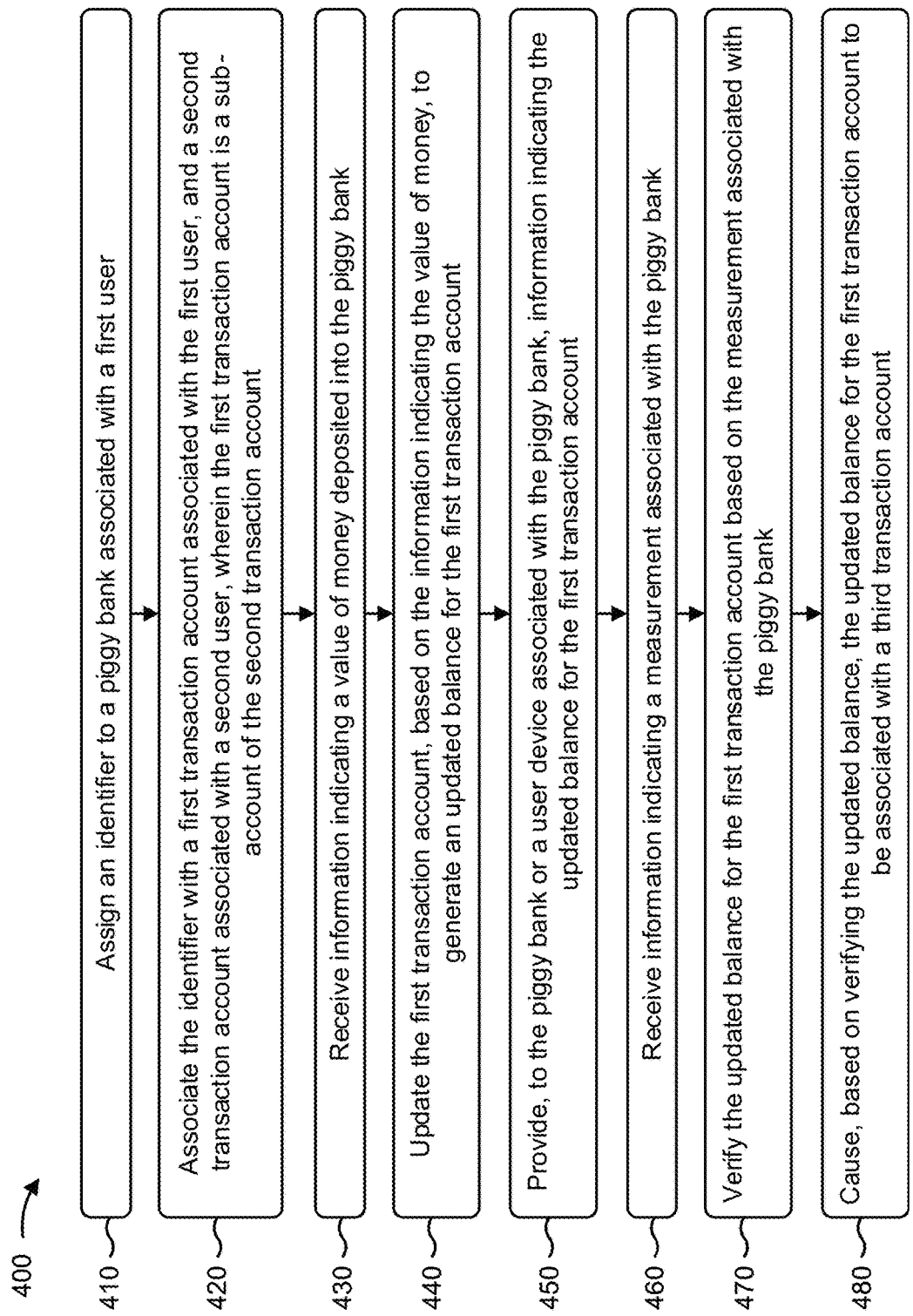

FIG. 4 is a flow chart of an example process 400 for associating a piggy bank with a first transaction account that is guaranteed by a second transaction account and managing the first transaction account. In some implementations, one or more process blocks of FIG. 4 may be performed by a financial platform (e.g., financial platform 220). In some implementations, one or more process blocks of FIG. 4 may be performed by another device or a group of devices separate from or including the financial platform, such as a user device (e.g., user device 210) and/or a server device (e.g., server device 240).

As shown in FIG. 4, process 400 may include assigning an identifier to a piggy bank associated with a child (block 410). For example, the financial platform (e.g., using computing resource 224, processor 320, memory 330, and/or the like) may assign an identifier to a piggy bank associated with a child, as described above.

As further shown in FIG. 4, process 400 may include associating the identifier with a first transaction account associated with the child and a second transaction account associated with a parent of the child, wherein the first transaction account is a sub-account of the second transaction account (block 420). For example, the financial platform (e.g., using computing resource 224, processor 320, storage component 340, and/or the like) may associate the identifier with a first transaction account associated with the child and a second transaction account associated with a parent of the child, as described above. In some implementations, the first transaction account may be a sub-account of the second transaction account.

As further shown in FIG. 4, process 400 may include receiving information indicating a value of money deposited into the piggy bank (block 430). For example, the financial platform (e.g., using computing resource 224, processor 320, communication interface 370, and/or the like) may receive information indicating a value of money deposited into the piggy bank, as described above.

As further shown in FIG. 4, process 400 may include updating the first transaction account, based on the information indicating the value of money, to generate an updated balance for the first transaction account (block 440). For example, the financial platform (e.g., using computing resource 224, processor 320, memory 330, and/or the like) may update the first transaction account, based on the information indicating the value of money, to generate an updated balance for the first transaction account, as described above.

As further shown in FIG. 4, process 400 may include providing, to the piggy bank or a user device associated with the piggy bank, information indicating the updated balance for the first transaction account (block 450). For example, the financial platform (e.g., using computing resource 224, processor 320, communication interface 370, and/or the like) may provide, to the piggy bank or a user device associated with the piggy bank, information indicating the updated balance for the first transaction account, as described above.

As further shown in FIG. 4, process 400 may include receiving information indicating a measurement associated with the piggy bank (block 460). For example, the financial platform (e.g., using computing resource 224, processor 320, communication interface 370, and/or the like) may receive information indicating a measurement associated with the piggy bank, as described above.

As further shown in FIG. 4, process 400 may include verifying the updated balance for the first transaction account based on the measurement associated with the piggy bank (block 470). For example, the financial platform (e.g., using computing resource 224, processor 320, memory 330, and/or the like) may verify the updated balance for the first transaction account based on the measurement associated with the piggy bank, as described above.

As further shown in FIG. 4, process 400 may include causing, based on verifying the updated balance, the updated balance for the first transaction account to be associated with a third transaction account (block 480). For example, the financial platform (e.g., using computing resource 224, processor 320, memory 330, storage component 340, communication interface 370, and/or the like) may cause, based on verifying the updated balance, the updated balance for the first transaction account to be associated with a third transaction account, as described above.

Process 400 may include additional implementations, such as any single implementation or any combination of implementations described below and/or in connection with one or more other processes described elsewhere herein.

In some implementations, when causing the updated balance for the first transaction account to be associated with the third transaction account, the financial platform may provide the updated balance for the first transaction account to a transaction card associated with the third transaction account. In some implementations, when causing the updated balance for the first transaction account to be associated with the third transaction account, the financial platform may cause the updated balance for the first transaction account to be issued as cash, and may cause the cash in an amount of the updated balance to be provided to the parent.

In some implementations, the financial platform may receive, from a merchant server device, information indicating a cost of an item purchased with the first transaction account, where the updated balance may be greater than the cost of the item. The financial platform may reduce the updated balance for the first transaction account by the cost of the item, and may provide, to the merchant server device, payment for the cost of the item from the updated balance for the first transaction account.

In some implementations, the financial platform may receive, from a merchant server device, information indicating a cost of an item purchased with the first transaction account, where the updated balance may be less than the cost of the item. The financial platform may reduce the updated balance for the first transaction account by a portion of the cost of the item, may reduce a balance for the second transaction account by a remaining portion of the cost of the item, may provide, to the merchant server device, payment for the portion of the cost of the item from the updated balance for the first transaction account, and may provide, to the merchant server device, payment for the remaining portion of the cost of the item from the balance for the second transaction account.

In some implementations, the piggy bank may include one or more sensors to identify the money deposited into the piggy bank and to determine the value of money.

In some implementations, when receiving the information indicating the value of money deposited into the piggy bank, the financial platform may receive the information indicating the value of money after a predetermined time period, may receive the information indicating the value of money based on the money being deposited into the piggy bank, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
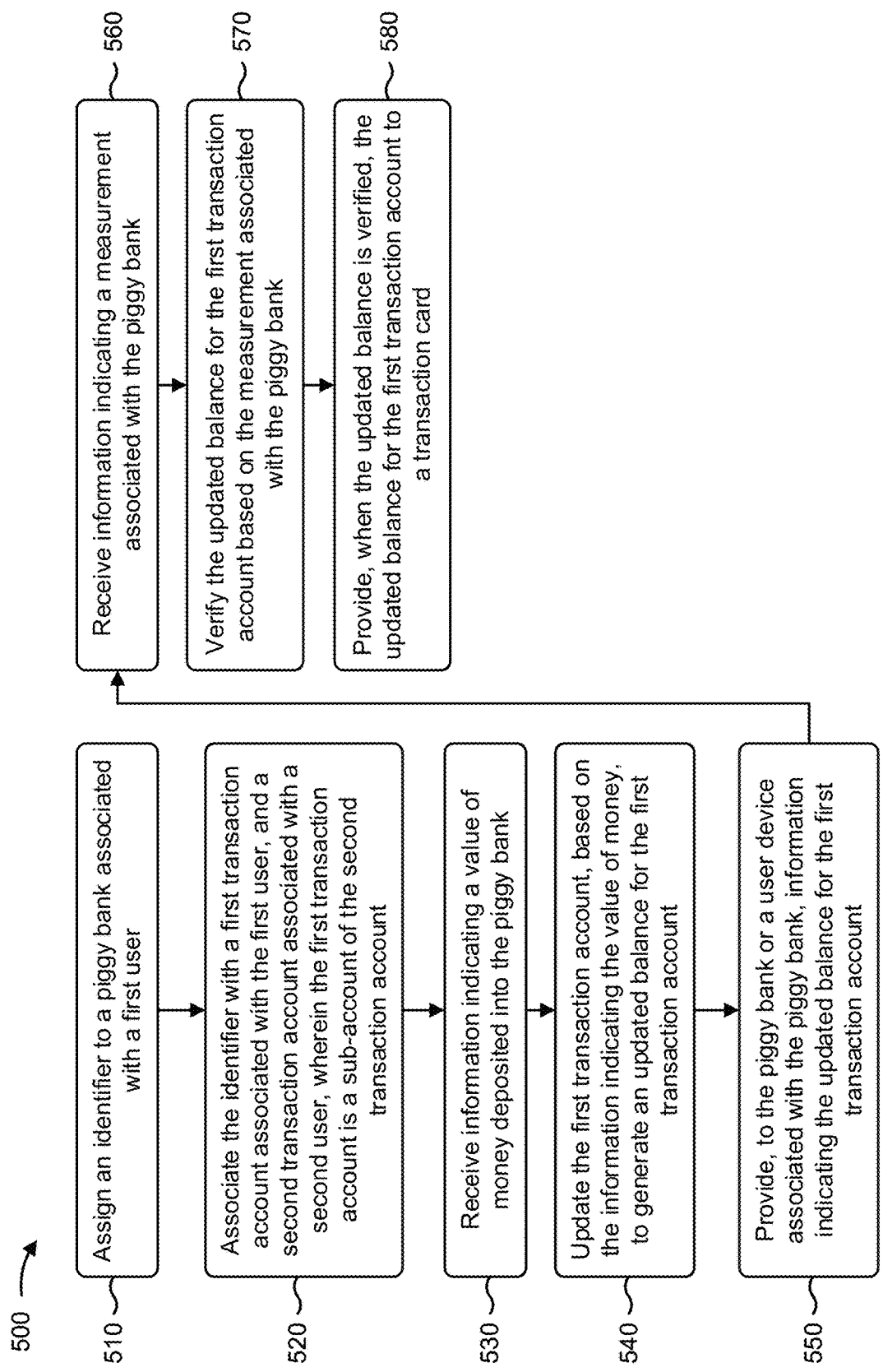

FIG. 5 is a flow chart of an example process 500 for associating a piggy bank with a first transaction account that is guaranteed by a second transaction account and managing the first transaction account. In some implementations, one or more process blocks of FIG. 5 may be performed by a financial platform (e.g., financial platform 220). In some implementations, one or more process blocks of FIG. 5 may be performed by another device or a group of devices separate from or including the financial platform, such as a user device (e.g., user device 210) and/or a server device (e.g., server device 240).

As shown in FIG. 5, process 500 may include assigning an identifier to a piggy bank associated with a first user (block 510). For example, the financial platform (e.g., using computing resource 224, processor 320, memory 330, and/or the like) may assign an identifier to a piggy bank associated with a first user, as described above.

As further shown in FIG. 5, process 500 may include associating the identifier with a first transaction account associated with the first user and a second transaction account associated with a second user, wherein the first transaction account is a sub-account of the second transaction account (block 520). For example, the financial platform (e.g., using computing resource 224, processor 320, storage component 340, and/or the like) may associate the identifier with a first transaction account associated with the first user and a second transaction account associated with a second user, as described above. In some implementations, the first transaction account may be a sub-account of the second transaction account.

As further shown in FIG. 5, process 500 may include receiving information indicating a value of money deposited into the piggy bank (block 530). For example, the financial platform (e.g., using computing resource 224, processor 320, communication interface 370, and/or the like) may receive information indicating a value of money deposited into the piggy bank, as described above.

As further shown in FIG. 5, process 500 may include updating the first transaction account, based on the information indicating the value of money, to generate an updated balance for the first transaction account (block 540). For example, the financial platform (e.g., using computing resource 224, processor 320, memory 330, and/or the like) may update the first transaction account, based on the information indicating the value of money, to generate an updated balance for the first transaction account, as described above.

As further shown in FIG. 5, process 500 may include providing, to the piggy bank or a user device associated with the piggy bank, information indicating the updated balance for the first transaction account (block 550). For example, the financial platform (e.g., using computing resource 224, processor 320, communication interface 370, and/or the like) may provide, to the piggy bank or a user device associated with the piggy bank, information indicating the updated balance for the first transaction account, as described above.

As further shown in FIG. 5, process 500 may include receiving information indicating a measurement associated with the piggy bank (block 560). For example, the financial platform (e.g., using computing resource 224, processor 320, communication interface 370, and/or the like) may receive information indicating a measurement associated with the piggy bank, as described above.

As further shown in FIG. 5, process 500 may include verifying the updated balance for the first transaction account based on the measurement associated with the piggy bank (block 570). For example, the financial platform (e.g., using computing resource 224, processor 320, memory 330, and/or the like) may verify the updated balance for the first transaction account based on the measurement associated with the piggy bank, as described above.

As further shown in FIG. 5, process 500 may include providing, when the updated balance is verified, the updated balance for the first transaction account to a transaction card (block 580). For example, the financial platform (e.g., using computing resource 224, processor 320, storage component 340, and/or the like) may provide, when the updated balance is verified, the updated balance for the first transaction account to a transaction card, as described above.

Process 500 may include additional implementations, such as any single implementation or any combination of implementations described below and/or in connection with one or more other processes described elsewhere herein.

In some implementations, the measurement associated with the piggy bank may include a weight of the piggy bank. In some implementations, the information indicating the measurement associated with the piggy bank may be received from a financial kiosk, a first financial institution associated with the first transaction account and the second transaction account, a second financial institution not associated with the first transaction account and the second transaction account, a courier delivery service, a postal service, an ecommerce service, and/or the like.

In some implementations, the financial platform may receive, from a merchant server device, information indicating a cost of an item to be purchased with the first transaction account, where the updated balance may be less than the cost of the item. The financial platform may provide, to the merchant server device and based on the updated balance being less than the cost of the item, information indicating denial of a transaction associated with the item, and may provide to the user device associated with the piggy bank the information indicating the denial of the transaction associated with the item, and information indicating a quantity of money to be provided to the piggy bank in order to purchase the item.

In some implementations, the second transaction account may be a guarantor account for the first transaction account. In some implementations, when receiving the information indicating the value of money deposited into the piggy bank, the financial platform may receive the information indicating the value of money deposited into the piggy bank from the user device associated with the piggy bank, may receive the information indicating the value of money deposited into the piggy bank from the piggy bank, and/or the like.

In some implementations, the piggy bank may include a user interface to display information indicating the value of money deposited into the piggy bank, the updated balance for the first transaction account, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for associating a piggy bank with a first transaction account that is guaranteed by a second transaction account and managing the first transaction account. In some implementations, one or more process blocks of FIG. 6 may be performed by a financial platform (e.g., financial platform 220). In some implementations, one or more process blocks of FIG. 6 may be performed by another device or a group of devices separate from or including the financial platform, such as a user device (e.g., user device 210) and/or a server device (e.g., server device 240).

As shown in FIG. 6, process 600 may include assigning an identifier to a piggy bank associated with a user (block 605). For example, the financial platform (e.g., using computing resource 224, processor 320, memory 330, and/or the like) may assign an identifier to a piggy bank associated with a user, as described above.

As further shown in FIG. 6, process 600 may include associating the identifier with a first transaction account associated with the user and a second transaction account, wherein the first transaction account is a sub-account of the second transaction account (block 610). For example, the financial platform (e.g., using computing resource 224, processor 320, storage component 340, and/or the like) may associate the identifier with a first transaction account associated with the user and a second transaction account, as described above. In some implementations, the first transaction account may be a sub-account of the second transaction account.

As further shown in FIG. 6, process 600 may include receiving information indicating a value of money deposited into the piggy bank (block 615). For example, the financial platform (e.g., using computing resource 224, processor 320, communication interface 370, and/or the like) may receive information indicating a value of money deposited into the piggy bank, as described above.

As further shown in FIG. 6, process 600 may include updating the first transaction account, based on the information indicating the value of money, to generate an updated balance for the first transaction account (block 620). For example, the financial platform (e.g., using computing resource 224, processor 320, memory 330, and/or the like) may update the first transaction account, based on the information indicating the value of money, to generate an updated balance for the first transaction account, as described above.

As further shown in FIG. 6, process 600 may include providing, to the piggy bank or a user device associated with the piggy bank, information indicating the updated balance for the first transaction account (block 625). For example, the financial platform (e.g., using computing resource 224, processor 320, communication interface 370, and/or the like) may provide, to the piggy bank or a user device associated with the piggy bank, information indicating the updated balance for the first transaction account, as described above.

As further shown in FIG. 6, process 600 may include receiving information indicating a measurement associated with the piggy bank (block 630). For example, the financial platform (e.g., using computing resource 224, processor 320, communication interface 370, and/or the like) may receive information indicating a measurement associated with the piggy bank, as described above.

As further shown in FIG. 6, process 600 may include verifying the updated balance for the first transaction account based on the measurement associated with the piggy bank (block 635). For example, the financial platform (e.g., using computing resource 224, processor 320, memory 330, and/or the like) may verify the updated balance for the first transaction account based on the measurement associated with the piggy bank, as described above.

As further shown in FIG. 6, process 600 may include receiving, from a merchant server device, information indicating a cost of an item purchased with the first transaction account, wherein the updated balance is greater than the cost of the item (block 640). For example, the financial platform (e.g., using computing resource 224, processor 320, communication interface 370, and/or the like) may receive, from a merchant server device, information indicating a cost of an item purchased with the first transaction account, as described above. In some implementations, the updated balance may be greater than the cost of the item.

As further shown in FIG. 6, process 600 may include reducing the updated balance for the first transaction account by the cost of the item (block 645). For example, the financial platform (e.g., using computing resource 224, processor 320, storage component 340, and/or the like) may reduce the updated balance for the first transaction account by the cost of the item, as described above.

As further shown in FIG. 6, process 600 may include providing, to the merchant server device, payment for the cost of the item from the updated balance for the first transaction account (block 650). For example, the financial platform (e.g., using computing resource 224, processor 320, memory 330, storage component 340, communication interface 370, and/or the like) may provide, to the merchant server device, payment for the cost of the item from the updated balance for the first transaction account, as described above.

Process 600 may include additional implementations, such as any single implementation or any combination of implementations described below and/or in connection with one or more other processes described elsewhere herein.

In some implementations, the financial platform may provide the updated balance for the first transaction account to a transaction card to be utilized by the user. In some implementations, the financial platform may cause the updated balance for the first transaction account to be issued as cash. In some implementations, the piggy bank may include one or more sensors to identify the money deposited into the piggy bank and to determine the value of money.

In some implementations, when receiving the information indicating the value of money deposited into the piggy bank, the financial platform may receive the information indicating the value of money after a predetermined time period, may receive the information indicating the value of money when the money is deposited into the piggy bank, and/or the like. In some implementations, the measurement associated with the piggy bank may include a weight of the piggy bank.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    assigning, by a device, an identifier to a piggy bank associated with a first user,
        wherein the piggy bank is provided with a security mechanism to detect tampering with the piggy bank;
    associating, by the device, the identifier with:
        a first transaction account associated with the first user, and
        a second transaction account associated with a second user,
            wherein the first transaction account is a sub-account of the second transaction account;
    receiving, by the device and from one or more sensors associated with the piggy bank, first information indicating a value of money deposited into the piggy bank;
    updating, by the device, the first transaction account, based on the first information indicating the value of the money, to generate an updated balance for the first transaction account;
    providing, by the device and to the piggy bank or a user device associated with the piggy bank, second information indicating the updated balance for the first transaction account;
    receiving, by the device, third information indicating a measurement associated with the piggy bank,
        wherein the measurement includes a quantity of money provided in the piggy bank, and
        wherein the third information is received from one or more of:
            a financial kiosk,
            a first financial institution associated with the first transaction account and the second transaction account,
            a second financial institution not associated with the first transaction account and the second transaction account,
            a courier delivery service,
            a postal service, or
            an ecommerce service;
    verifying, by the device, the updated balance for the first transaction account based on comparing the measurement associated with the piggy bank and the value of the money associated with the first information,
        wherein the updated balance for the first transaction account is adjusted based on a difference between the measurement associated with the piggy bank and the value of the money associated with the first information; and
    causing, by the device and based on verifying the updated balance, the updated balance for the first transaction account to be associated with a third transaction account.

2. The method of claim 1, wherein causing the updated balance for the first transaction account to be associated with the third transaction account comprises:
    providing the updated balance for the first transaction account to a transaction card associated with the third transaction account.

3. The method of claim 1, wherein causing the updated balance for the first transaction account to be associated with the third transaction account comprises:
    causing the updated balance for the first transaction account to be issued as cash from the third transaction account; and
    causing the cash in an amount of the updated balance to be provided to the second user.

4. The method of claim 1, further comprising:
    receiving, from a merchant server device, fifth information indicating a cost of an item purchased with the first transaction account,
        wherein the updated balance is greater than the cost of the item;
    reducing the updated balance for the first transaction account by the cost of the item; and
    providing, to the merchant server device, payment for the cost of the item from the updated balance for the first transaction account.

5. The method of claim 1, further comprising:
    receiving, from a merchant server device, fifth information indicating a cost of an item purchased with the first transaction account,
        wherein the updated balance is less than the cost of the item;
    reducing the updated balance for the first transaction account by a portion of the cost of the item;
    reducing a balance for the second transaction account by a remaining portion of the cost of the item;
    providing, to the merchant server device, a first payment for the portion of the cost of the item from the updated balance for the first transaction account; and
    providing, to the merchant server device, a second payment for the remaining portion of the cost of the item from the balance for the second transaction account.

6. The method of claim 1, wherein receiving the first information indicating the value of the money deposited into the piggy bank comprises one or more of:
    receiving the first information indicating the value of the money after a predetermined time period; or
    receiving the first information indicating the value of the money based on the money being deposited into the piggy bank.

7. The method of claim 1, wherein the one or more sensors include one or more of:
    a photosensor,
    a camera, or
    a mechanical counting device.

8. The method of claim 1, wherein the security mechanism is electrically controlled by a signal that allows opening of the piggy bank.

9. The method of claim 8, wherein the signal is from the financial kiosk.

10. The method of claim 1, wherein the security mechanism includes a sensor that detects movement of the piggy bank when the user device is not detected adjacent to the piggy bank.

11. A device, comprising:
one or more memories; and
one or more processors, communicatively coupled to the one or more memories, configured to:
assign an identifier to a piggy bank associated with a first user,
wherein the piggy bank is provided with a security mechanism to detect tampering with the piggy bank;
associate the identifier with:
a first transaction account associated with the first user, and
a second transaction account associated with a second user,
wherein the first transaction account is a sub-account of the second transaction account;
receive, from one or more sensors associated with the piggy bank, first information indicating a value of money deposited into the piggy bank,
wherein the one or more sensors are configured to determine the value of the money deposited;
update the first transaction account, based on the first information indicating the value of the money, to generate an updated balance for the first transaction account;
provide, to the piggy bank or a user device associated with the piggy bank, second information indicating the updated balance for the first transaction account;
receive third information indicating a measurement associated with the piggy bank,
wherein the measurement includes fourth information identifying a quantity of money provided in the piggy bank, and
wherein the third information is received from one or more of:
a financial kiosk,
a first financial institution associated with the first transaction account and the second transaction account,
a second financial institution not associated with the first transaction account and the second transaction account,
a courier delivery service,
a postal service, or
an ecommerce service;
verify the updated balance for the first transaction account based on comparing the measurement associated with the piggy bank and the value of the money associated with the first information,
wherein the updated balance for the first transaction account is adjusted based on a difference between the measurement associated with the piggy bank and the value of the money associated with the first information; and
provide, when the updated balance is verified, the updated balance for the first transaction account to a transaction card.

12. The device of claim 11, wherein the one or more processors are further configured to:
receive, from a merchant server device, fifth information indicating a cost of an item to be purchased with the first transaction account,
wherein the updated balance is less than the cost of the item;
provide, to the merchant server device and based on the updated balance being less than the cost of the item, sixth information indicating denial of a transaction associated with the item; and
provide to the user device associated with the piggy bank:
the sixth information indicating the denial of the transaction associated with the item, and
seventh information indicating a quantity of money to be provided to the piggy bank in order to purchase the item.

13. The device of claim 11, wherein the second transaction account is a guarantor account for the first transaction account.

14. The device of claim 11, wherein the one or more processors, when receiving the first information indicating the value of the money deposited into the piggy bank, are configured to one or more of:
receive the first information indicating the value of the money deposited into the piggy bank from the user device associated with the piggy bank; or
receive the first information indicating the value of the money deposited into the piggy bank from the piggy bank.

15. The device of claim 11, wherein the piggy bank includes a user interface to display the first information indicating:
the value of the money deposited into the piggy bank, and
the second information indicating the updated balance for the first transaction account.

16. The device of claim 11, wherein the one or more processors, when providing the updated balance for the first transaction account to the transaction card, are to:
provide the updated balance for the first transaction account to one or more of:
a credit card,
a debit card,
a gift card, or
a rewards card.

17. A non-transitory computer-readable medium storing instructions, the instructions comprising:
one or more instructions that, when executed by one or more processors, cause the one or more processors to:
assign an identifier to a piggy bank associated with a user,
wherein the piggy bank is provided with a security mechanism to detect tampering with the piggy bank;
associate the identifier with:
a first transaction account associated with the user, and
a second transaction account,
wherein the first transaction account is a sub-account of the second transaction account;
receive, from one or more sensors associated with the piggy bank, first information indicating a value of money deposited into the piggy bank;
update the first transaction account, based on the first information indicating the value of the money, to generate an updated balance for the first transaction account;

provide, to the piggy bank or a user device associated with the piggy bank, second information indicating the updated balance for the first transaction account;

receive third information indicating a measurement associated with the piggy bank,
- wherein the third information is received from one or more of:
  - a financial kiosk,
  - a first financial institution associated with the first transaction account and the second transaction account,
  - a second financial institution not associated with the first transaction account and the second transaction account,
  - a courier delivery service,
  - a postal service, or
  - an ecommerce service;

verify the updated balance for the first transaction account based on comparing the measurement associated with the piggy bank and the value of the money associated with the first information,
- wherein the updated balance for the first transaction account is adjusted based on a difference between the measurement associated with the piggy bank and the value of the money associated with the first information;

receive, from a merchant server device, fifth information indicating a cost of an item purchased with the first transaction account,
- wherein the updated balance is greater than the cost of the item;

reduce the updated balance for the first transaction account by the cost of the item; and provide, to the merchant server device, payment for the cost of the item from the updated balance for the first transaction account.

18. The non-transitory computer-readable medium of claim 17, wherein the instructions further comprise:
one or more instructions that, when executed by the one or more processors, cause the one or more processors to:
provide the updated balance for the first transaction account to a transaction card to be utilized by the user.

19. The non-transitory computer-readable medium of claim 17, wherein the instructions further comprise:
one or more instructions that, when executed by the one or more processors, cause the one or more processors to:
cause the updated balance for the first transaction account to be issued as cash.

20. The non-transitory computer-readable medium of claim 17, wherein the one or more instructions, that cause the one or more processors to receive the first information indicating the value of the money deposited into the piggy bank, cause the one or more processors to one or more of:
receive the first information indicating the value of the money after a predetermined time period; or
receive the first information indicating the value of the money when the money is deposited into the piggy bank.

* * * * *